Nov. 30, 1937.      A. L. NELSON         2,100,719
                      PISTON
            Filed Dec. 5, 1933        3 Sheets-Sheet 1

INVENTOR:
Adolph L. Nelson
BY Ramsey and Kent
his ATTORNEY

Nov. 30, 1937.  A. L. NELSON  2,100,719
PISTON
Filed Dec. 5, 1933  3 Sheets-Sheet 2

INVENTOR:
Adolph L. Nelson
BY
Ramsey and Kent
his ATTORNEY

Nov. 30, 1937. A. L. NELSON 2,100,719
PISTON
Filed Dec. 5, 1933 3 Sheets-Sheet 3

INVENTOR:
Adolph L. Nelson
BY
Ramsey and Kent
his ATTORNEY

Patented Nov. 30, 1937

2,100,719

UNITED STATES PATENT OFFICE 2,100,719

PISTON

Adolph L. Nelson, Detroit, Mich.

Application December 5, 1933, Serial No. 700,958

12 Claims. (Cl. 309—11)

This invention provides an improved construction for pistons, especially for those formed of light-weight materials such as alloys of aluminum. These alloys have many well-known advantages in pistons for internal combustion engines, but their chief disadvantage over cast-iron, formerly used exclusively, is their higher rate of thermal expansion. The piston of the present invention has features of construction which combine to overcome this disadvantage.

An important feature of the invention resides in the provision of a piston having uninterrupted arc-shaped parts under the pin bosses, and a pair of openings or slots in the piston skirt, each of said openings being placed so as to have a horizontal leg extending below a pin boss and a vertical leg extending between the pin boss and a thrust face, thereby increasing the flexibility of a portion of the skirt.

On the side of each pin boss opposite the openings there is provided a web which connects the pin boss to one of the thrust faces, and a rib extends at a downward angle from the pin boss along the web, the purpose of this rib being to introduce a beneficial distortion into the lower part of the skirt.

The thrust face on the side opposite the openings is separated from the head by a slot, and a slot extends downwardly into this thrust face to a point below the upper ends of the openings. The amount of overlap of this downward slot with the openings determines the flexibility of the skirt to a large degree.

The skirt is finished in such a way as to give it an oval external shape throughout its length, the small diameter coinciding with the axis of the piston pin bosses. The expansion of the piston head under operating temperatures acts through the slanting ribs to help "round out" the oval shape thereby preventing undue increase in skirt size on the diameter perpendicular to the axis of the pin bosses.

The upper part of the skirt is protected from the effects of undue expansion by curved reliefs in connection with the downward slot and the oval shape of the skirt, while the lower portion of the skirt is protected by the openings and the action of the slanting ribs on the oval skirt.

The invention also includes an improved rib section connecting each pin boss and the head so as to provide maximum strength against strains placed upon this section during operation of the engine.

A further object is to provide a piston in which at least one of the thrust faces is separated from the head by a slot, and the head has an oil-ring groove located above the slot and oil holes extending through the wall of the head at the bottom of the groove, the oil holes being placed so as to avoid weakening of the head and to provide for better lubrication of the thrust faces.

Additional objects and advantages of the invention will become apparent as the description proceeds.

While a preferred form of the invention is disclosed herein for purposes of illustration, it should be understood that various changes may be made without departure from the spirit of the invention as set forth and claimed.

Figure 1:
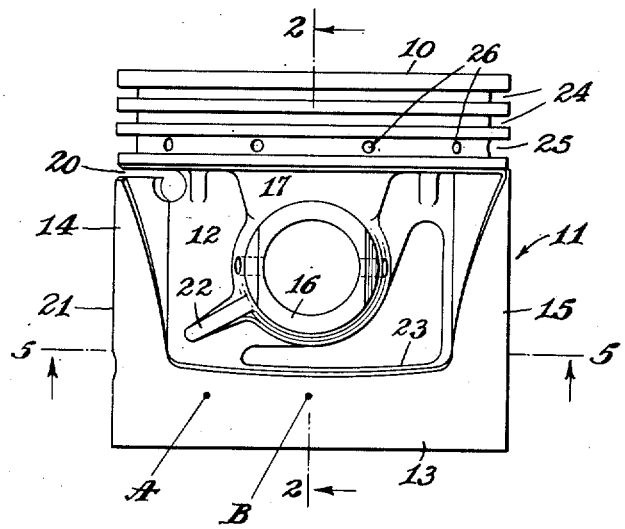
Fig. 1 is a side elevation of a piston embodying the invention.
Figure 2:
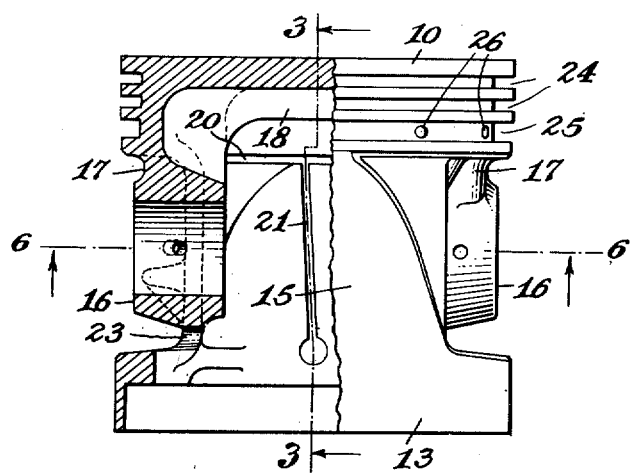
Fig. 2 is a partial section on line 2—2 of Fig. 1.
Figure 3:
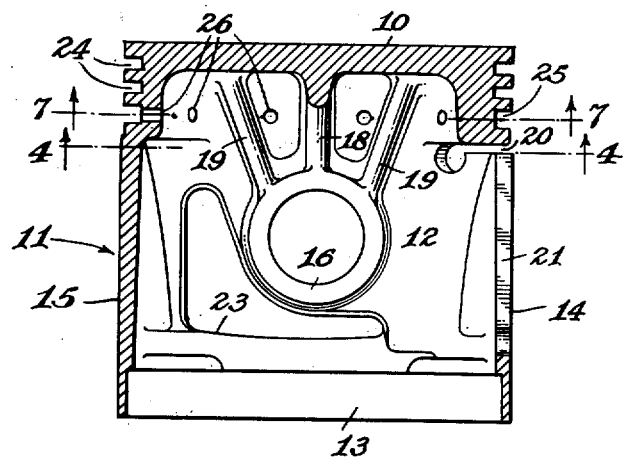
Fig. 3 is a section on line 3—3 of Fig. 2.

The piston disclosed in the drawings includes a head 10 having a top wall and a cylindrical side wall, a skirt 11, the skirt including chordal webs 12, a lower annular part 13, and thrust faces 14 and 15. Piston pin bosses 16 are carried by chordal webs 12.

Figure 4:
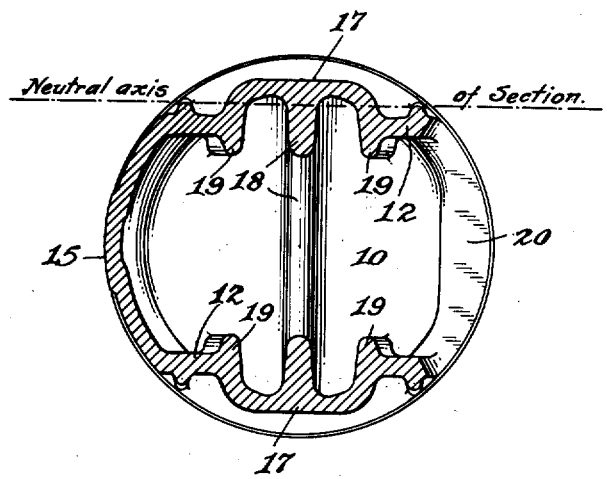
Fig. 4 is a section on line 4—4 of Fig. 3.
Figure 5:
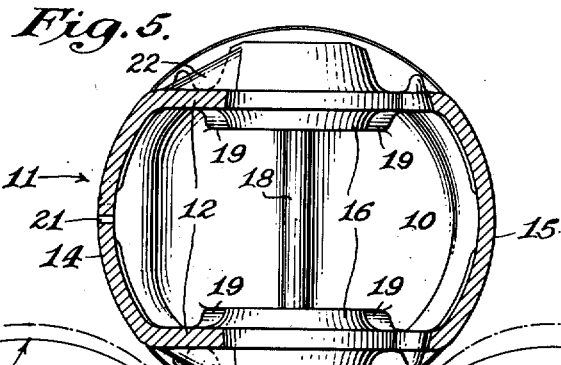
Fig. 5 is a section on line 5—5 of Fig. 1.

When the piston is operating in an engine the entire force applied to the top of the piston is transmitted to the connecting rod through the parts of the piston connecting the pin bosses to the head. A feature of the present invention lies in an improved rib section between the head and each pin boss. These sections should have minimum weight with maximum strength against breakage, especially against strains tending to bend the pin bosses inwardly with relation to the head. So far as these strains are concerned the neutral axis of the section may be taken as the line illustrated in Figure 4, which is at right angles to axis of the piston pin bosses. In order to give maximum strength the parts are arranged so that large masses of metal are disposed on each side of and spaced a considerable distance from the neutral axis of the section. In the embodiment illustrated this object is attained by the following combination of parts:

A tapered web member 17 has its wide end connected to the side wall of the head and its lower end attached to the outer end of the pin bosses, and is located outwardly of the neutral axis of the rib section and across the axis of the piston pin bosses. The parts of the chordal webs 12 that extend between the head and pin boss are located inwardly from the neutral axis of the section. A central reinforcing rib 18 extends upwardly along the inner wall of web 17 from the boss to the head, continues across the under wall of the head and then extends downwardly along the web 17 on the opposite side of the piston. Two transverse inclined side ribs 19 extend from the pin boss along the side wall of the head to the top wall, these ribs projecting inwardly from the lateral sides of the tapered web 17 and after connecting with the web 12 extend still farther inwardly in order to give an added amount of metal spaced inwardly from the neutral axis of the section. This arrangement is substantially a U beam with the legs of the U crossing the neutral axis of the section and with the additional reinforcing rib 18 disposed vertically in the channel of the U, a construction which provides substantially large masses of metal disposed on opposite sides of, and spaced from, the neutral axis of the section and offering maximum resistance to compressive and tensional stresses resulting from forces which tend to twist the section about the neutral axis.

The upper end of the thrust face 14 is separated from the head by a slot 20, and a slot 21 extends part way downward in thrust face 14. Thrust face 15 is unslotted and remains attached to the head. Each thrust face has its lateral edges relieved along curved lines which converge toward the top of the thrust face.

Each of the chordal webs 12 is formed with an opening or slot 23, usually in the process of casting. Each of the openings has its horizontal leg extending from the side of thrust face 15 between the upper edge of the annular part 13 and the pin boss, while its vertical leg extends upwardly between the pin boss and the thrust face 15. These vertical legs extend upwardly past the lower end of slot 21, and the amount of overlap of this downward slot 21 with the vertical legs of the L openings determines to a large extent the relative flexibility of the skirt. In the structure illustrated herein this overlap is equal to 40 per cent of the diameter of the skirt, but this overlap can be varied as desired. It is clearly shown in Fig. 1 that the opening 23 extends across a vertical axis passing through the center line of the pin bosses and extends farther toward the thrust face and is wider on the side of said vertical axis toward the thrust face 15 than toward thrust face 14.

A tapered rib 22 extends downwardly from each pin boss at an angle between the vertical and the horizontal. Each of these ribs extends along the outer surface of one of the chordal webs 12 and is directed toward the slotted thrust face 14. One purpose of the ribs 22 is to reinforce the webs 12 against possible cracking and another purpose is to introduce a beneficial distortion into the piston skirt in a manner that will now be described.

Where the head of a piston is separated from the skirt by a slot or slots, the head, as it expands under the heat of operation, spreads the piston pin bosses, and if there is a rigid connection extending straight downwardly from the bosses to the lower annular part, the latter part is pulled outwardly under the bosses, this distortion of the skirt decreasing the diameter of the skirt on the diameter at right angles to the axis of the pin bosses.

Figure 8:
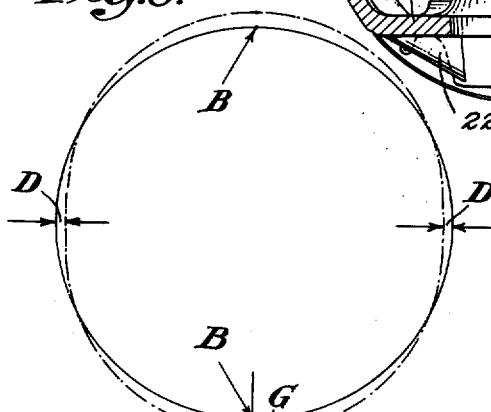
Figs. 8 and 9 are diagrammatic views illustrating the action of the lower cylindrical ring of the piston.

Thus in Fig. 8, B represents points on the lower ring under the pin bosses. If the expansion of the pin bosses is transmitted directly to the points B, the skirt wall at these points will be carried outwardly a distance G, and the diameter at right angles to the axis of the bosses will be correspondingly diminished by the amount D.

Figure 9:
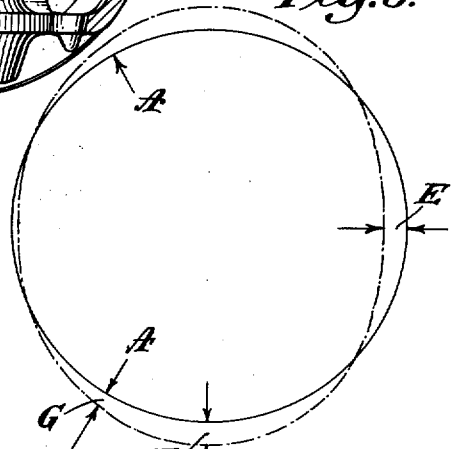
Figure 6:
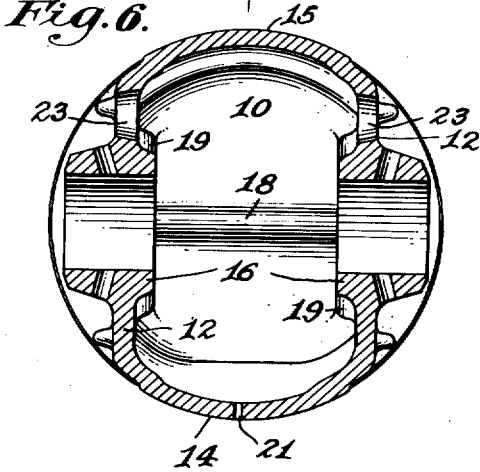
Fig. 6 is a section on line 6—6 of Fig. 2.

However, in the piston illustrated herein, the outward movement of the bosses is not transmitted to the points B but is carried by the ribs 22 to the points A, as shown in Fig. 9, thereby deflecting the skirt at these points by the distance G. This action produces a skirt deflection F on the axis of the pin bosses, which is greater than the distance G, and causes a corresponding deflection E on the diameter at right angles to the axis of the bosses; distance E being greater than distance D of Fig. 8.

In both cases the lower part 13 is ground oval with the short axis of the oval corresponding with the axis of the bosses so as to permit outward movement of the wall along this axis. The use of the ribs 22 transmits the outward movement of the bosses to the lower annular part at points spaced away from the axis of the bosses, both points being located on the same side of said axis, thereby utilizing greater leverage and causing a much greater decrease in the effective diameter of the skirt than if there were a vertical connection from the bosses to the lower circular part. This beneficial distortion produces a relatively large decrease in the effective diameter of the skirt by forces within the piston and without depending on pressure of the cylinder wall against the skirt.

In grinding the skirt it is given an oval shape throughout its entire length, the small diameter of the oval coinciding with the axis of the piston pin bosses. It is desirable to use as little oval as possible at the thrust faces because the less oval used, the better the bearing on the thrust faces. More oval is permitted under the pin bosses to obtain proper control of the diameter perpendicular to the pin bosses in the manner above described.

Parts of the lower part 13 form uninterrupted arcs under the pin bosses, and these arcs cooperate with the openings 23 in the beneficial distortion above described.

In the above-described skirt construction the excessive expansion of the light-weight alloy is taken care of at the bottom of the skirt by the openings 23 and the beneficial distortion, and at the top of the skirt by the T slot, the curved reliefs and the beneficial distortion. These combinations overlap to take care of the expansion of the middle portion of the skirt.

The piston head is provided with ring grooves 24 for compression rings and with a ring groove 25 for an oil control ring. Oil holes 26 are provided to permit escape of oil to the interior of the piston and a particular feature of this invention lies in the disposition of these oil holes.

Figure 7:
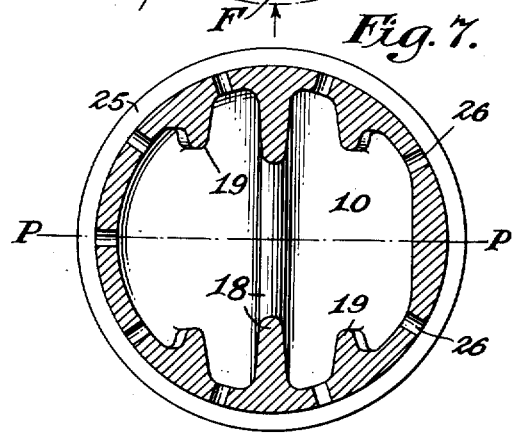
Fig. 7 is a section on line 7—7 of Fig. 3.

In the usual construction, 8 to 12 oil holes are spaced equally about the circumference of the piston head, and where one or both of the thrust faces are slotted from the head, the presence of the oil holes close to the center line passing through the thrust faces (P—P in Fig. 7), causes a weakening of the piston head above the slot. The present invention avoids this weakening by spacing the oil holes unequally about the head, the two holes nearest to the center line P—P on the side of the slot 20 being spaced farther apart than the rest of the holes. In the embodiment illustrated these holes are spaced about 30° away from the center line. This wider spacing of the oil holes can be used above one or both thrust faces. Tests have shown that this arrangement of oil holes is substantially as effective as holes equally spaced as far as oil economy is concerned and the arrangement disclosed herein gives substantial increase in the strength of the head.

Thus, for example, with a certain piston having a thrust face slotted from the head and with oil holes equally spaced about the head, the head cracks on application of about 8500 lbs. across the center of the piston head perpendicular to the pin. The same piston with the arrangement of oil holes disclosed herein withstands pressures of over 12,000 lbs. These are average results of tests on several identical pistons close to 3 inches in diameter.

Another advantage of this placing of the oil holes is that more oil is left on the cylinder wall in the path of the thrust face. This is due to the face that the oil is not drained from the oil-ring groove so rapidly above the thrust face and the groove retains more oil at this place. In this way the thrust faces, which carry the chief bearing loads against the cylinder wall, are given better lubrication without reducing the efficiency of the oil ring at the sides of the bore that do not take the thrust loads.

I claim:

1. A piston comprising a head, pin bosses connected to the head, a skirt having a lower annular part and oppositely arranged thrust faces, one of the thrust faces being separated from the head by a slot and having a slot extending downwardly from the top of the thrust face, chordal webs extending between the slotted face and the pin bosses said webs being homogeneous with the slotted face and the pin bosses and a tapered rib extending from each pin boss along the outside of each of said webs at a downward angle between the vertical and the horizontal, and toward the slotted thrust face.

2. A piston comprising a head, pin bosses connected to the head, a skirt having a lower annular part and oppositely arranged thrust faces, a pair of chordal webs extending between the thrust faces and homogeneous therewith, a piston pin boss connected to each web, a tapered rib extending from each pin boss along a web at a downward angle between the vertical and horizontal, and each web being formed with an L-shaped opening disposed with its horizontal leg extending below a pin boss and with its vertical leg extending upwardly along the pin boss on the side opposite the tapered rib.

3. A piston comprising a head, a skirt having a lower annular part and oppositely arranged thrust faces, one of the thrust faces having its upper end separated from the head by a slot and having a slot extending downwardly from the top of the thrust face, a pair of chordal webs extending between the thrust faces and homogeneous therewith, a piston pin boss connected to each web, each web being formed with an L-shaped opening disposed with its horizontal leg extending between a pin boss and the lower annular part of the skirt and with its vertical leg extending between the pin boss and the unslotted thrust face and a tapered rib extending from each pin boss along a web at a downward angle between the vertical and the horizontal, and toward the slotted thrust face.

4. A piston comprising a head having a top and a cylindrical side wall, a skirt, and piston pin bosses connected to the head, a horizontal section taken transversely of the parts connecting the pin bosses to the head showing that said parts include a chordal web extending downwardly from the side wall of the head to the outer end of the pin boss, a pair of inner chordal webs extending from the inner part of the pin boss to the side wall of the head and connected to the skirt, the inner and outer webs lying in different vertical planes, and a pair of transverse ribs having their lower ends connected to the inner end of the pin boss and extending along said side wall and joining the top of the head and connecting the sides of the outer web with the inner webs.

5. A piston comprising a head having a top and a cylindrical side wall, a skirt, and piston pin bosses connected to the head, a horizontal section taken transversely of the parts connecting the pin bosses to the head showing that said parts include a chordal web extending downwardly from the side wall of the head to the outer end of the pin boss, a pair of inner chordal webs extending from the inner part of the pin boss to the side wall of the head and connected to the skirt, the inner and outer webs lying in different vertical planes, and a pair of transverse ribs having their lower ends connected to the inner end of the pin boss and extending along said side wall and joining the top of the head and connecting the sides of the outer web with the inner webs, said transverse ribs diverging from each other as they approach the top of the head.

6. A piston comprising a head having a top and a cylindrical side wall, a skirt, and piston pin bosses connected to the head, a horizontal section taken transversely of the parts connecting the pin bosses to the head showing that said parts include a chordal web extending downwardly from the side wall of the head to the outer end of the pin boss, a pair of inner chordal webs extending from the inner part of the pin boss to the side wall of the head and connected to the skirt, the inner and outer webs lying in different vertical planes, and a pair of transverse ribs having their lower ends connected to the inner end of the pin boss and extending along said side wall and joining the top of the head and connecting the sides of the outer web with the inner webs, and a central rib extending from the pin boss to the top of the head and connected to the outer web.

7. An all-aluminum piston comprising a head, a skirt having a lower annular part and oppositely arranged thrust faces, a pair of chordal webs extending between the thrust faces and homogeneous therewith, a piston pin boss located on each web, a tapered rib extending from the lower part of each pin boss along a chordal web toward one of the thrust faces, each web being formed with an opening extending below the pin boss, the opening extending across a vertical plane passing through the center line of the pin bosses, each opening extending farther toward the thrust face and being wider on the side of said axis away from the tapered rib than on the side toward the tapered rib, the outer surface of the skirt having an oval shape with the minor axis of the oval coinciding with the axis of the piston pin bosses.

8. A piston comprising a head, a skirt having a lower annular part and oppositely arranged thrust faces, one of the thrust faces being formed with a vertically extending slot, a pair of chordal webs extending between the thrust faces and homogeneous therewith, a piston pin boss located on each web, a tapered rib extending from the lower part of each pin boss along a chordal web toward one of the thrust faces, said tapered ribs being homogeneous with the webs and extending toward the slotted thrust face, each web being formed with an opening extending below the pin boss, the opening extending across a vertical plane passing through the center line of the pin bosses, each opening extending a shorter distance toward the thrust face and being narrower on the side of said axis toward the slotted thrust face than toward the other thrust face, the outer surface of the skirt having an oval shape with the minor axis of the oval coinciding with the axis of the piston pin bosses.

9. A light-metal trunk piston having a head and a skirt, wrist-pin bearings, a frame structure connecting said bearings with said head, a flat web extending transversely of the wrist pin axis and connecting said skirt with said structure, said skirt having a circumferentially complete rim separated from said web by a horizontally extending opening and being split longitudinally at one of its bearing faces, and a tapered rib extending from the lower part of each pin boss to the web, said rib being homogeneous with the boss and with the web and extending toward the split thrust face.

10. A light-metal trunk piston having a head and a skirt, wrist-pin bearings, a frame structure connecting said bearings with said head, a flat web extending transversely of the wrist-pin axis and connecting said skirt with said structure, said skirt being split longitudinally at one of its bearing faces and having a circumferentially complete lower rim separated from said web by a horizontally extending aperture below the wrist-pin bearing, said rim being thickened below said aperture to stiffen the same, and a tapered rib extending from the lower part of each pin boss to the web, said rib being homogeneous with the boss and with the web and extending toward the split thrust face.

11. An all-aluminum piston comprising a head, a skirt having a lower annular part and oppositely arranged thrust faces, a pair of chordal webs extending between the thrust faces and homogeneous therewith, a piston pin boss located on each web, a tapered rib extending from the lower part of each pin boss along a chordal web toward one of the thrust faces, each web being formed with an opening extending below the pin boss, the opening extending across a vertical axis passing through the center line of the pin bosses, each opening extending farther toward the thrust face and being wider on the side of said axis away from the tapered rib.

12. A piston comprising a head, a skirt having a lower annular part and oppositely arranged thrust faces, one of the thrust faces being formed with a vertically extending slot, a pair of chordal webs extending between the thrust faces and homogeneous therewith, a piston pin boss located on each web, a tapered rib extending from the lower part of each pin boss along a chordal web toward one of the thrust faces, said tapered ribs being homogeneous with the webs and extending toward the slotted thrust face, each web being formed with an opening extending below the pin boss, the opening extending across a vertical axis passing through the center line of the pin bosses, each opening extending a shorter distance toward the thrust face and being narrower on the side of said axis toward the slotted thrust face than toward the other thrust face.

ADOLPH L. NELSON.

DISCLAIMER 2,100,719.—*Adolph L. Nelson*, Detroit, Mich. PISTON. Patent dated November 30, 1937. Disclaimer filed December 29, 1939, by the assignee, *Bohn Aluminum & Brass Corporation*.

Hereby enters this disclaimer to claims 4 to 12 inclusive of said patent.

[*Official Gazette January 30, 1940.*]

8. A piston comprising a head, a skirt having a lower annular part and oppositely arranged thrust faces, one of the thrust faces being formed with a vertically extending slot, a pair of chordal webs extending between the thrust faces and homogeneous therewith, a piston pin boss located on each web, a tapered rib extending from the lower part of each pin boss along a chordal web toward one of the thrust faces, said tapered ribs being homogeneous with the webs and extending toward the slotted thrust face, each web being formed with an opening extending below the pin boss, the opening extending across a vertical plane passing through the center line of the pin bosses, each opening extending a shorter distance toward the thrust face and being narrower on the side of said axis toward the slotted thrust face than toward the other thrust face, the outer surface of the skirt having an oval shape with the minor axis of the oval coinciding with the axis of the piston pin bosses.

9. A light-metal trunk piston having a head and a skirt, wrist-pin bearings, a frame structure connecting said bearings with said head, a flat web extending transversely of the wrist pin axis and connecting said skirt with said structure, said skirt having a circumferentially complete rim separated from said web by a horizontally extending opening and being split longitudinally at one of its bearing faces, and a tapered rib extending from the lower part of each pin boss to the web, said rib being homogeneous with the boss and with the web and extending toward the split thrust face.

10. A light-metal trunk piston having a head and a skirt, wrist-pin bearings, a frame structure connecting said bearings with said head, a flat web extending transversely of the wrist-pin axis and connecting said skirt with said structure, said skirt being split longitudinally at one of its bearing faces and having a circumferentially complete lower rim separated from said web by a horizontally extending aperture below the wrist-pin bearing, said rim being thickened below said aperture to stiffen the same, and a tapered rib extending from the lower part of each pin boss to the web, said rib being homogeneous with the boss and with the web and extending toward the split thrust face.

11. An all-aluminum piston comprising a head, a skirt having a lower annular part and oppositely arranged thrust faces, a pair of chordal webs extending between the thrust faces and homogeneous therewith, a piston pin boss located on each web, a tapered rib extending from the lower part of each pin boss along a chordal web toward one of the thrust faces, each web being formed with an opening extending below the pin boss, the opening extending across a vertical axis passing through the center line of the pin bosses, each opening extending farther toward the thrust face and being wider on the side of said axis away from the tapered rib.

12. A piston comprising a head, a skirt having a lower annular part and oppositely arranged thrust faces, one of the thrust faces being formed with a vertically extending slot, a pair of chordal webs extending between the thrust faces and homogeneous therewith, a piston pin boss located on each web, a tapered rib extending from the lower part of each pin boss along a chordal web toward one of the thrust faces, said tapered ribs being homogeneous with the webs and extending toward the slotted thrust face, each web being formed with an opening extending below the pin boss, the opening extending across a vertical axis passing through the center line of the pin bosses, each opening extending a shorter distance toward the thrust face and being narrower on the side of said axis toward the slotted thrust face than toward the other thrust face.

ADOLPH L. NELSON.

DISCLAIMER 2,100,719.—*Adolph L. Nelson*, Detroit, Mich. PISTON. Patent dated November 30, 1937. Disclaimer filed December 29, 1939, by the assignee, *Bohn Aluminum & Brass Corporation*.

Hereby enters this disclaimer to claims 4 to 12 inclusive of said patent.

[*Official Gazette January 30, 1940.*]

DISCLAIMER 2,100,719.—*Adolph L. Nelson*, Detroit, Mich. PISTON. Patent dated November 30, 1937. Disclaimer filed December 29, 1939, by the assignee, *Bohn Aluminum & Brass Corporation*.

Hereby enters this disclaimer to claims 4 to 12 inclusive of said patent.

[*Official Gazette January 30, 1940.*]